Nov. 24, 1931. O. P. HAEGELE 1,833,644
INTERMITTENT MOTION TRANSMITTING DEVICE
Filed July 12, 1929
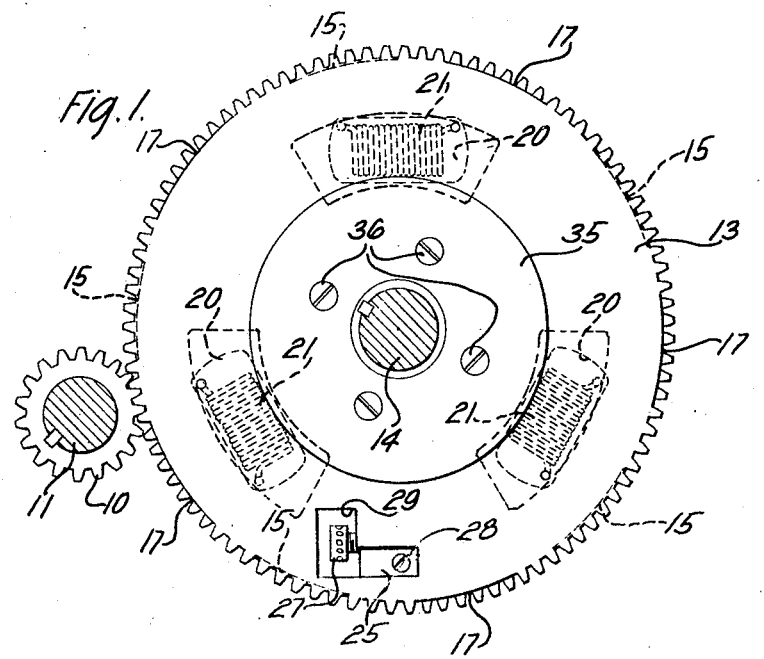
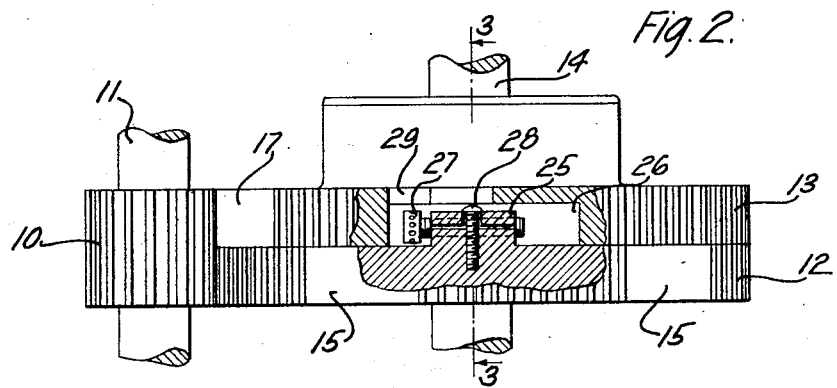
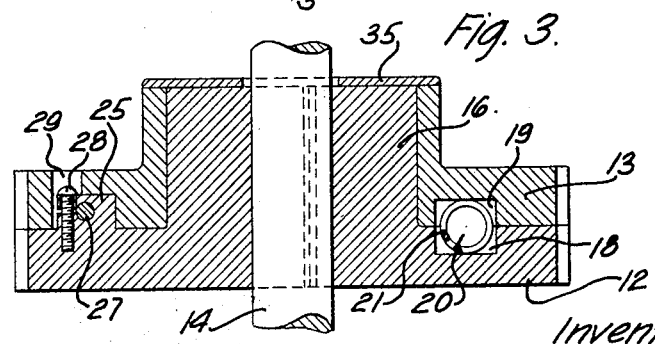
Inventor
Otto P. Haegele
By H. A. Patterson Atty.

Patented Nov. 24, 1931

1,833,644

UNITED STATES PATENT OFFICE

OTTO P. HAEGELE, OF CHICAGO, ILLINOIS, ASSIGNOR TO WESTERN ELECTRIC COMPANY, INCORPORATED, OF NEW YORK, N. Y., A CORPORATION OF NEW YORK

INTERMITTENT MOTION TRANSMITTING DEVICE

Application filed July 12, 1929. Serial No. 377,661.

This invention relates to intermittent motion transmitting devices, and more particularly to an intermittent gear drive.

The principal object of the invention is to provide a quick acting intermittent motion transmitting device of simple construction and efficient operation.

In accordance with one embodiment, the present invention contemplates the provision of an intermittent gear drive in which a constantly rotating pinion engages the teeth of a pair of parallel gears having mutilated toothed portions, one gear being journaled on the hub of the other gear secured to a shaft to be rotated at predetermined intervals. The gears are interconnected by concealed coil springs and one of the gears carries an adjustable stop projecting into a recess of the other gear, whereby in cooperation with the mutilated toothed portions an intermittent motion is transmitted to the shaft.

It is believed that the invention will be clearly understood from the following detailed description of one embodiment thereof and the accompanying drawings, in which Fig. 1 is a plan view of an intermittent gear drive embodying the invention;

Fig. 2 is a front elevational view thereof, and

Fig. 3 is a sectional view taken on line 3—3 of Fig. 2.

Referring now to the drawings in which like reference numerals designate similar parts throughout the several views, a constantly rotating pinion 10 keyed to a driving shaft 11 meshes with cooperating parallel gears 12 and 13. The gear 12 is keyed to a shaft 14 connected to any apparatus desired to be intermittently driven and is provided with spaced mutilated portions 15—15 and a hub 16 (Fig. 3) on which is journaled the gear 13 also provided with mutilated portions 17—17. As shown in Figs. 1 and 3, the adjacent faces of the gears 12 and 13 have a plurality of recesses 18 and 19, respectively, forming chambers 20—20 in which are mounted tension coil springs 21; each of the springs has one end thereof secured to the gear 12 and the other end secured to the gear 13.

A bifurcated projecting portion 25 of the gear 12 extends into a recess 26 of the gear 13 and has threaded therein a stop pin 27 which is clamped or locked in an adjusted position by a screw 28 threaded into the bifurcations of the projecting portion 25. Positioned immediately above the stop pin 27 when the gears are in their normal position is an opening 29 communicating with the recess 26, so that by inserting a tool therein the stop pin can be easily adjusted without disassembling the gears. In order to maintain the gear 12 in position upon the hub 16 with its inner face contacting with the adjacent face of the gear 13, a circular plate 35 is secured to the outer face of the hub 16 by screws 36—36.

In operation, the shaft 11 and pinion 10 are rotated in a counter-clockwise direction by any suitable driving means (not shown). When the pinion meshes with the teeth of the gear 12, the shaft 14 is rotated clockwise, but when the pinion 10 rotates the gear 12 to one of the mutilated portions 15, the gear 12 and shaft 14 keyed thereto stands still while the pinion meshes with the teeth of the gear 13 and rotates it clockwise against the tension of the springs 21—21. After a predetermined period of intermittence in the movement of the shaft 14 as determined by the adjustment of the stop pin 27, the right hand wall (Fig. 2) of the gear 13 forming the recess 26 abuts the end of the stop pin and forces the gear 12 and shaft 14 in a clockwise direction until the teeth of the gear 12 again mesh with the driving pinion. Upon one of the mutilated portions 17 of the gear 13 rotating into position adjacent the driving pinion 10, the energy stored in the coil springs 21—21 rotates the gear 13 counter-clockwise into its normal position with respect to the gear 12. From the foregoing description it will be readily understood that the above cycle of operations are continuously repeated thus to actuate intermittently the shaft 14 and any apparatus connected thereto at predetermined intervals.

It will be understood that the embodiment of the invention herein described and illustrated is merely a convenient and useful form of the invention, which is capable of many other modifications without departing from the spirit and scope of the invention as defined by the appended claims.

What is claimed is:

1. In an intermittent motion transmitting device, a movable member having a recess, a movable element having a projecting portion extending into the recess of the movable member, means operatively associated with the element and the member for intermittently actuating the element, and means carried by the projecting portion for varying the period of intermittence in the movement of the element.

2. In an intermittent motion transmitting device, a shaft, a mutilated gear secured thereto and having a hub portion, a mutilated gear journaled on the hub of the first mentioned gear, a rotating pinion meshing with the gears, resilient means interconnecting the gears, and means carried by the gears for varying the period of intermittence in the movement of the shaft.

3. In an intermittent motion transmitting device, a shaft, a mutilated gear having a recess, a mutilated gear rotatably mounted thereon and having a recess cooperating with the recess in the other gear to form a chamber, a spring positioned within the chamber and interconnecting the gears, adjustable means carried by one of the gears adapted to engage a portion of the other gear at predetermined intervals, and a continuously rotating pinion meshing with the mutilated gears for effecting the intermittent actuation of the shaft.

4. In a device for producing intermittent motion, a continuously driven gear, an interrupted gear meshing therewith, a second interrupted gear idly mounted on the first mentioned interrupted gear, resilient means connecting the two interrupted gears and tending to rotate them relative to each other, and adjustable means for limiting the rotation of the interrupted gears relative to each other.

In witness whereof, I hereunto subscribe my name this 26th day of June, A. D. 1929.

OTTO P. HAEGELE.